(12) United States Patent
Ruffini et al.

(10) Patent No.: US 10,790,921 B2
(45) Date of Patent: Sep. 29, 2020

(54) CONFIGURATION OF SYNCHRONISATION NETWORK

(71) Applicant: Telefonaktiebolaget LM Ericsson (publ), Stockholm (SE)

(72) Inventors: Stefano Ruffini, Rome (IT); Giulio Bottari, Leghorn (IT); Manuel Nardelli, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/242,501

(22) Filed: Jan. 8, 2019

(65) Prior Publication Data

US 2019/0140757 A1    May 9, 2019

Related U.S. Application Data

(63) Continuation of application No. 15/492,597, filed on Apr. 20, 2017, now Pat. No. 10,211,941, which is a
(Continued)

(30) Foreign Application Priority Data

Nov. 19, 2009 (EP) .................... 09176539

(51) Int. Cl.
*H04L 12/26* (2006.01)
*H04J 3/06* (2006.01)

(52) U.S. Cl.
CPC .......... *H04J 3/0658* (2013.01); *H04J 3/0682* (2013.01); *H04J 3/0641* (2013.01)

(58) Field of Classification Search
None
See application file for complete search history.

(56) References Cited

U.S. PATENT DOCUMENTS

| | | | |
|---|---|---|---|
| 4,736,393 A | 4/1988 | Grimes | |
| 4,926,446 A | 5/1990 | Grover | |

(Continued)

FOREIGN PATENT DOCUMENTS

| | | |
|---|---|---|
| EP | 0511786 | 4/1992 |
| EP | 2093925 | 8/2009 |

(Continued)

*Primary Examiner* — Zewdu A Beyen
(74) *Attorney, Agent, or Firm* — Baker Botts, LLP

(57) ABSTRACT

Configuring a node (410, A-I, L-O) of a synchronization network, involves determining information about synchronization sources of a plurality of synchronization trails for passing synchronization information from the synchronization source (A, L, O, PRC) to the node to provide a synchronization reference. After determining automatically (210, 250, 330, 335, 340) synchronization transmission characteristics of trails (EP, FG, GH, HM, MN, OF, FI, IH) which use packet-based communication, the trails are compared automatically (240, 370), using their source information and their synchronization transmission characteristics, for selecting winch of these trails to use for providing the synchronization reference for the node (N). Compared to selections made based on source alone, using the synchronization transmission characteristics of the pocket based parts can enable a better choice of trail, and can enable comparison with synchronous type trails, and so enable hybrid synchronization network to be configured and maintained.

20 Claims, 12 Drawing Sheets

Related U.S. Application Data continuation of application No. 13/508,406, filed as application No. PCT/EP2010/050526 on Jan. 18, 2010, now Pat. No. 9,647,784.

(56) References Cited

U.S. PATENT DOCUMENTS

| | | | |
|---|---|---|---|
| 6,408,310 | B1 | 6/2002 | Hart |
| 6,711,411 | B1 | 3/2004 | Ruffini |
| 8,321,534 | B1 * | 11/2012 | Roskind ........... H04N 21/25808 709/220 |
| 2010/0128703 | A1 | 5/2010 | Brand |
| 2010/0329284 | A1 | 12/2010 | Wong |

FOREIGN PATENT DOCUMENTS

| | | |
|---|---|---|
| WO | 1997/33396 | 9/1997 |
| WO | 1998/37651 | 8/1998 |
| WO | 2002/39630 | 5/2002 |

* cited by examiner

| Network Element | Synch From | Priority | Traceable to | Status (QL) | Sync Method | Sup. Status | Node Functions |
|---|---|---|---|---|---|---|---|
| A | - | - | - | "Working" | - | X = ... | Network PRC |
| B | A | 1 | A | Locked (G.811) | Phy | X = ... | ... |
| B | B (Internal Clock) | 2 | B | Stand-By (G.812) | - | X = ... | ... |
| C | B | 1 | A-B | Locked (G.811) | Phy | X = ... | G.8262 |
| C | B | 2 | A-B | Stand-By (G.811) | Phy | X = ... | ... |
| C | C (Internal Clock) | 3 | C | Stand-By (G.8262) | - | X = ... | ... |
| D | B | 1 | A-B | Locked (G.811) | Phy | X = ... | G.812 |
| D | C | 2 | A-B-C | Stand-By (G.811) | Phy | X = ... | X = ... |
| D | D (Internal Clock) | 3 | D | Stand-By (G.812) | - | X = ... | X = ... |
| E | D | 1 | A-B-C-D | Locked (G.811) | Phy | X = ... | G.8263/ PTP Master |
| E | E (Internal Clock) | 2 | E | Stand-By (G.8263) | - | X = ... | ... |
| F | E | 1 | A-B-C-D-E | Locked (G.811) | Packet | X = ... | G.8263/ BC |
| F | O | 2 | O | Locked (GPS) | Packet | X = ... | ... |
| F | F (Internal Clock) | 3 | F | Stand-By (G.8263) | - | X = ... | ... |
| G | - | - | - | - | - | - | Forwarding |
| H | - | - | - | - | - | - | G.8263/ TC |
| N | E | 1 | A-B-D-E-F-(G)-H-(M) | Locked (G.811) | Packet | X = | G.8263/ PTP Slave |
| N | O | 2 | O-F-(G)-H-(M) | Locked (GPS) | Packet | X = | ... |
| N | N (Internal Clock) | 3 | G | Stand-By (G.8263) | - | X = ... | ... |
| O | - | - | GPS | Locked | - | X = ... | G.8263/PTP Master (GPS) |

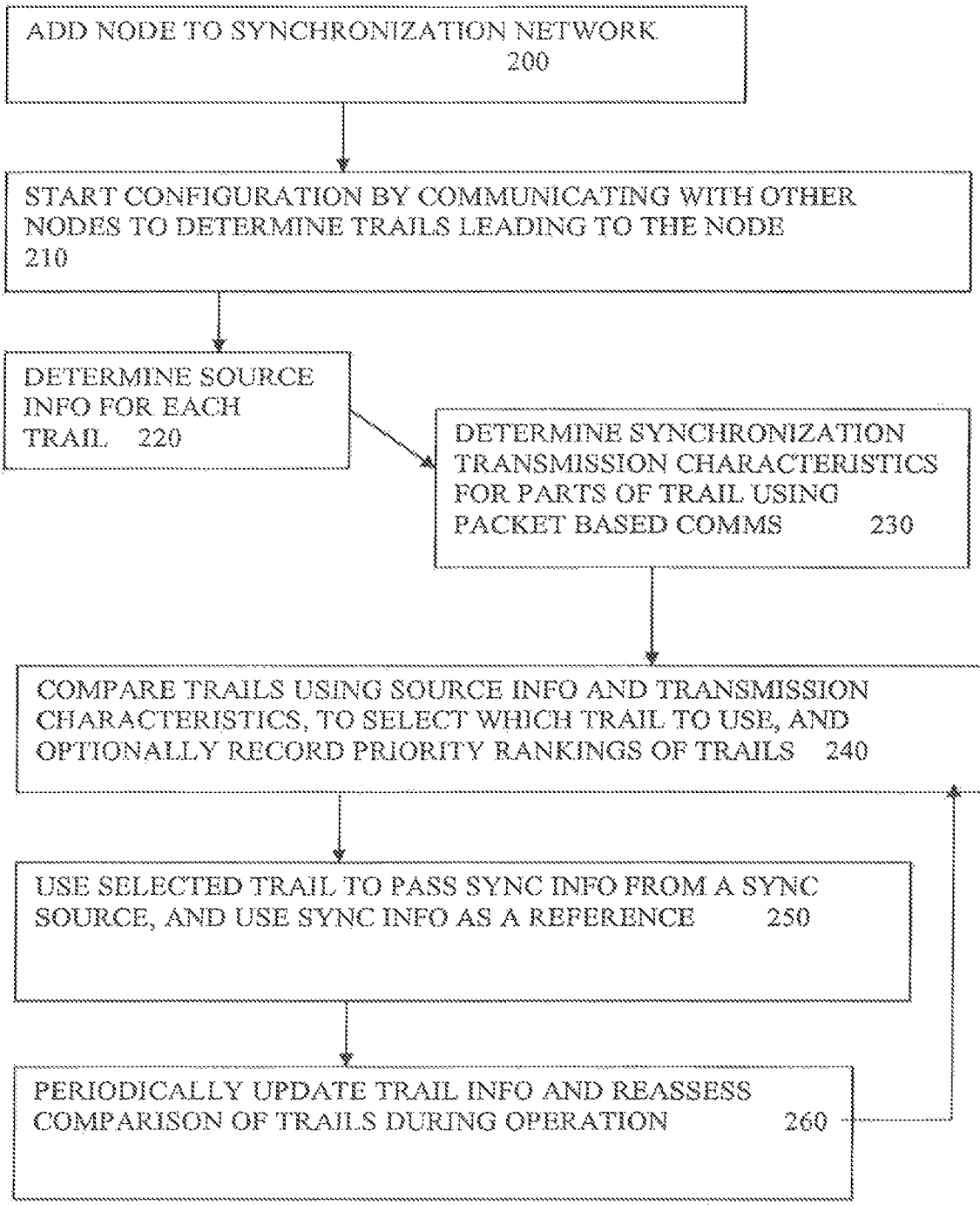

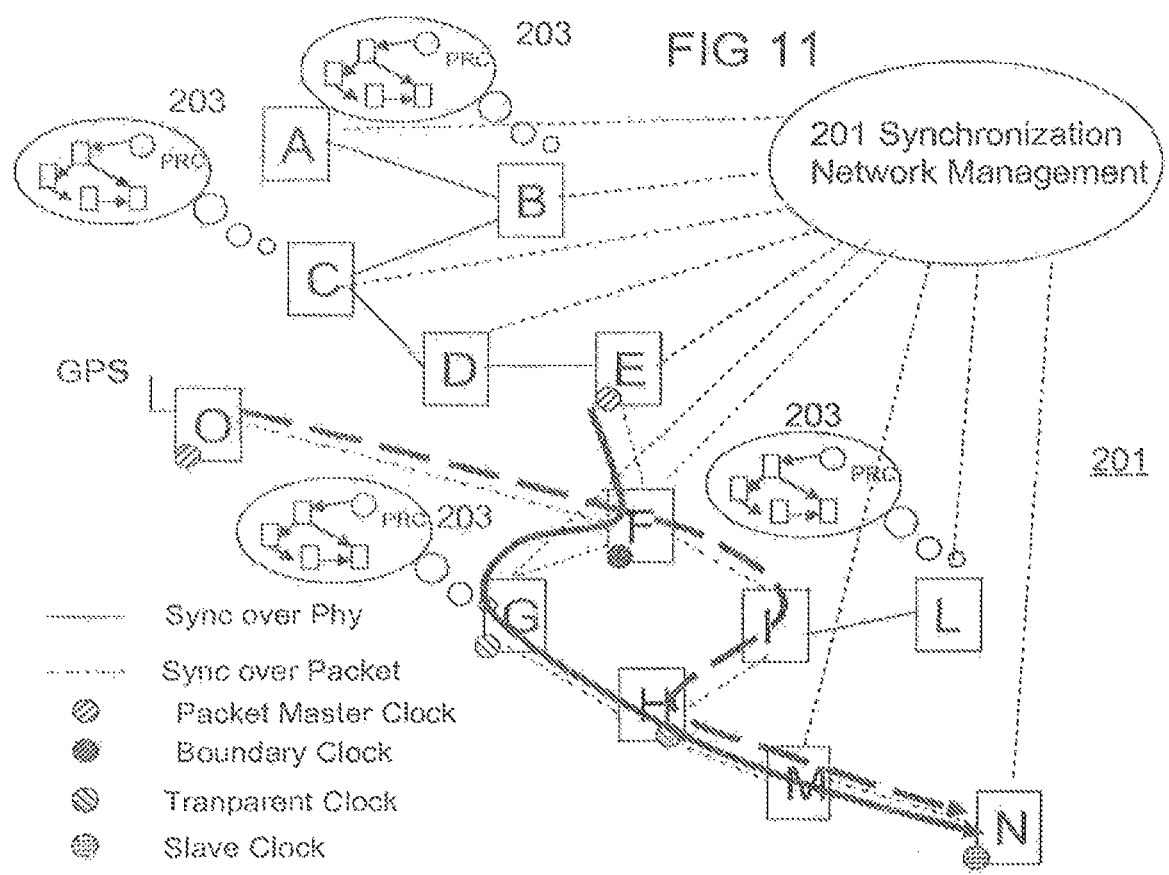

| | |
|---|---|
| Sub-Type (Sync-Specification) = 1 (*) | Length = Total length of the Sub-TLV |
| Sub-Sub-Type = 1 (LC-Sync for SyncE) (**) | Length = Total length of the Sub-Sub-TLV |
| Sub-Sub-SubType = 3 | Length = 1 byte |
| Link Component ID = 1 | |
| Sub-Sub-SubType = 4 | Length = 1 byte |
| Parameter 1 = Quality Level | |
| Sub-Sub-SubType = 5 | Length = 1 byte |
| Parameter 2 = Sync Reference Priority | |
| Sub-Sub-SubType = 6 | Length = TBD |
| Parameter 3 = ... | |
| Sub-Sub-Type = 1 (LC-Sync for SyncE) (**) | Length = Total length of the Sub-Sub-TLV |
| Sub-Sub-SubType = 3 | Length = 1 byte |
| Link Component ID = 2 | |
| Sub-Sub-SubType = 4 | Length = 1 byte |
| Parameter 1 = Quality Level | |
| Sub-Sub-SubType = 5 | Length = 1 byte |
| Parameter 2 = Sync Reference Priority | |
| Sub-Sub-SubType = 6 | Length = TBD |
| Parameter 3 = ... | |

| | |
|---|---|
| Sub-Type (Sync-Specification) = 1 (*) | Length = Total length of the Sub-TLV |
| Sub-Sub-Type = 2 (Generic-Node) (**) | Length = Total length of the Sub-Sub-TLV |
| Sub-Sub-SubType = 3 | Length = TBD |
| Parameter 1 = Node Function (***) | |
| Sub-Sub-SubType = 4 | Length = TBD |
| Parameter 2 = Supervision Status | |
| Sub-Sub-SubType = 5 | Length = TBD |
| Parameter 3 = ... | |

CONFIGURATION OF SYNCHRONISATION NETWORK

PRIORITY

This application is a continuation, under 35 U.S.C. § 120, of U.S. patent application Ser. No. 15/492,597 filed on Apr. 20, 2017, which is a continuation, under 35 U.S.C. § 120, of U.S. patent application Ser. No. 13/508,406, now U.S. Pat. No. 9,647,784, which is a U.S. National Stage Filing under 35 U.S.C. § 371 of International Patent Application Serial No. PCT/EP2010/150526, filed Jan. 18, 2010, and entitled "Configuration Of Synchronisation Network" which claims priority to European Patent Application No. 09176539.6 filed Nov. 19, 2009, ail of which are hereby incorporated by reference in their entirety.

FIELD OF THE INVENTION

This invention relates to methods of configuring nodes of a synchronization network, to nodes for such networks, to management systems for such networks, to synchronization networks, to corresponding computer programs and to databases for use in configuration of such networks.

BACKGROUND

There are many types of communications networks, for conveying information between remote points. For example wide area networks belonging to telecommunications providers, internet service providers, company intranets, cable television distribution systems and other data communication networks can use optical networks in which digital information is conveyed in the form of optical signals through optical fibers. Digital information in communication networks can be categorised as asynchronous or synchronous types. Synchronous types such as SDH (Synchronous Digital Hierarchy) require a common timing reference to operate accurately. That is, the clocks in one node of the network should operate at the same speed as the clocks in other nodes of the network.

To provide for a common timing reference, communication networks carrying digital information can include synchronization networks, whose job it is to ensure that a common timing reference is used throughout the communications network. One such synchronization network is described in European Telecommunication Standards Institute (ETSI) document European Guide (EG) 201 793 v1.1.1 (2000-10), entitled "Transmission and Multiplexing (TM); Synchronization Network Engineering". This document describes the various elements that make up a synchronization network, and the principles of operation by which such a network distributes accurate timing information from so-called Primary Reference Clocks (PRCs) to the clocks located in other pieces of equipment throughout the network. PRCs are the highest quality clocks in a network, and are usually based on a free-running Caesium Beam oscillator giving a so very accurate clock performance.

Poor network synchronization usually leads to large amounts of jitter and wander, and, consequently, to transmission errors and buffer under/overflow. Both these faults will result in service problems causing high error rates and service unavailability. In the best case, then, poor synchronization causes only few inconveniences to any other network layer; in the worst case, it can make the entire telecommunication network stop passing traffic. A well-planned and maintained synchronization network is then a prerequisite for avoiding or reducing a risk of critical failures in traffic networks.

The planning of a synchronization network is typically performed manually, according to some rules as defined in relevant ITU-T recommendations (e.g., ITU-T G.803) and other relevant standards (e.g. the above mentioned ETSI EG 201 793). Some computer-aided tools may assist the synchronization network planning and maintenance by, for instance, supporting the off-line design of the reference timing signals distribution, as well as providing simulations of the synchronization network normal operation and fault scenarios.

The management of a live synchronization network, on the other hand, is usually distributed over a number of platforms, as the types of the equipment participating into the synchronization network can be different. Therefore separate network management systems have to coexist, each taking care of a network type, e.g., synchronization dedicated, switching, transmission, and so forth. These management systems usually only provide the means to monitor the synchronization network and detect possible failures; in the latter case the single nodes will rearrange according to their synchronization set-up, or it will be up to the operator to perform recovery actions.

In case of a physical layer based synchronization network, the synchronization network is typically non-dedicated, meaning it is superimposed on the communications network and the transport layer of this network is the carrier of the reference timing signal. Due to that, although this is the most commonly used method, some issues may arise; this type of network is generally complicated to plan, difficult to operate, might be dependent on other operators and on the type of communications network it is superimposed on.

Accurate planning of non-dedicated synchronization networks is generally a complicated task. Even if this is done perfectly in the initial planning, it requires significant effort in the re-planning of the synchronization network every time other network types/layers are changed.

Additional issues may arise when deploying new and heterogeneous technologies. For instance, synchronization networks can be hybrid networks made up of trails having some parts using synchronous communications and other parts using packet-based communications. For example, nodes supporting either TDM legacy (e.g., PDH, SDH), or synchronous Ethernet, can be mixed with those using packet based technologies to transfer the synchronization information. The synchronization network management, in this case, appears extremely challenging and may significantly increase the OPEX (operational expenditure) for an operator.

It is known from the Precision Time protocol (PTP) (IEEE standard 1588-2008 Standard for a Precision Clock Synchronization Protocol for Networked Measurement and Control Systems) to send timing information over packet networks, so that carrier Ethernet networks, for example, can carry telecom quality clocks to network nodes. This standard defines a structured time stamp based on the output of a master clock at a time of transmission of the timing packet, and an Ethernet or IP packet location for it.

PTP uses a two way transfer technique to enable frequency, time and phase alignment to be generated by slave nodes. It defines master nodes, boundary nodes and transparent nodes. The packets can be passed by any Ethernet nodes and be treated as regular data packets.

SUMMARY

An object of the invention is to provide an improved apparatus or method for configuring a synchronization network. According to a first aspect, the invention provides:

A method of configuring a node of a synchronization network, the method comprising the steps of: a) determining information about synchronization sources of a plurality of synchronization trails for passing synchronization information from the synchronization source to the node to provide a synchronization reference, a part of at least one of the trails using packet-based communication to pass the synchronization information, b) determining automatically synchronization transmission characteristics of the part which uses the packet-based communication, and c) comparing automatically the trails leading to the node, using the determined source information and using the determined synchronization transmission characteristics, for selecting which of these trails and related synchronization source to use for providing the synchronization reference for the node (N).

Compared to selections made based on source alone, by determining and using the synchronization transmission characteristics of the packet based parts, a better choice of trail can be made, and the trails can be compared more readily with trails not using packet-based communication. This is particularly useful for networks such as hybrid synchronization networks having different types of trails, with parts which are packet-based and parts which are synchronous, such as those based on physical layer links. It can help enable such hybrid networks to be configured and maintained automatically in a more unified or integrated manner. This can reduce the amount of time and money spent managing and maintaining such hybrid synchronization networks. This is particularly useful where communication networks are more complex mixtures of legacy TDM and packet based technologies, and have more widely distributed synchronization sources, making their synchronization networks more complex.

Any additional features can be added to those discussed above, and some are described in more detail below.

Another aspect of the invention can involve a node for a synchronization network, the node having: a) a trail information manager arranged to determine information about sources of a plurality of synchronization trails which lead to the node, for passing synchronization information from the synchronization sources to the node, to provide a synchronization reference, a part of at least one of the trails using packet-based communication to pass the synchronization information, the trail manager also being arranged to determine automatically synchronization transmission characteristics of the part which uses the packet-based communication, and b) a comparator arranged to compare the trails leading to the node using the synchronization transmission characteristics, for selecting which of the trails to use for providing the synchronization reference for the node. Any additional features can be added. Another aspect provides a management system for a synchronization network, the management system being arranged to carry out the method of configuring as set out above. Such centralised configuring can avoid delays in propagating changes across a large network, and make it easier for an operator to monitor or intervene.

Another aspect provides a synchronization network having a number of nodes, and having a number of synchronization trails for passing synchronization information from a synchronization source to the nodes of the hybrid synchronization network, the hybrid synchronization network having a management system arranged to carry out the method of configuring as set out above.

Another aspect provides a computer program stored on a computer readable medium and comprising instructions executable by a processor to cause the processor to carry out the method of configuring as set out above.

Another aspect provides a database for configuration of a node of a synchronization network, the database comprising a record of synchronization sources of a plurality of synchronization trails for passing synchronization information from the synchronization sources to the node, to provide a synchronization reference, a part of at least one of the trails using packet-based communication, and the database also comprising a record of synchronization transmission characteristics of the part using packet-based communication, and a record of which of the trails has been selected to provide the synchronization reference.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 4 shows a database table of source and transmission characteristics for trails, according to an embodiment, FIGS. 5 to 9 show steps in configuring a synchronization network according to embodiments, FIG. 11 shows a schematic view of a synchronization network, showing two example trails to node N, FIGS. 12 and 13 show examples of sync-specification Sub-TLVs.

DESCRIPTION OF THE PREFERRED EMBODIMENTS

Figure 1:
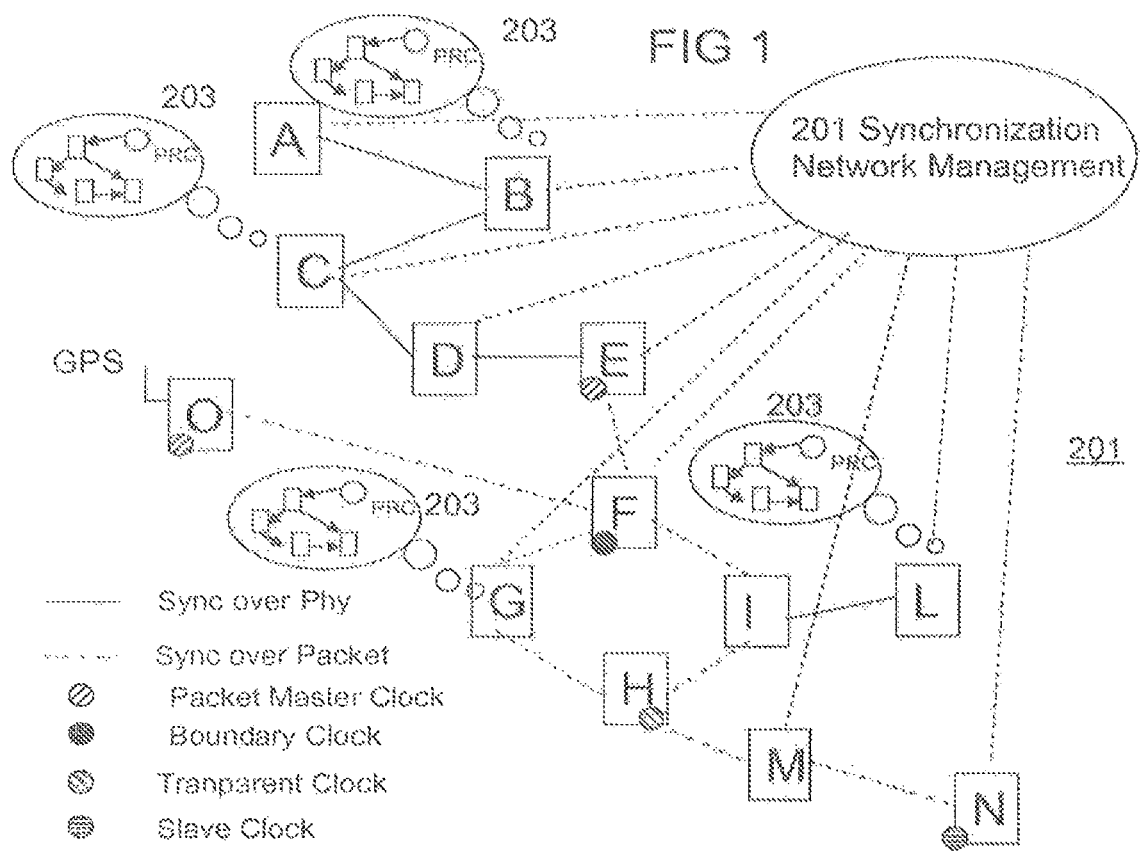
FIG. 1 shows a schematic view of a synchronization network.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Definitions

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to switching nodes can encompass any kind of switching node, not limited to the types described.

References to software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

References to trails can encompass any indication or description of a path followed by synchronization information, such as a list of nodes, or a list of links between nodes, or list of locations or directions to be followed, or an algorithm for calculating such lists or directions, or any other similar indication or description.

References to nodes of a network can encompass any kind of identifiable location in the network having any function such as routing or switching or multiplexing or demultiplexing or for supporting various transport technologies such as OTN, SDH, or any other kind of processing of information passed across the network, not limited to any level of integration, or size or bandwidth or bit rate and so on.

References to packet-based can encompass any kind of packet having any kind of header, or framing, and can be transmitted asynchronously, or transmitted over a synchronous link. In context of sync, such packets may have timestamp in header or payload for example. Examples are NTP packets or PTP packets as defined by RFC 1305, and many other types can be envisaged.

References to hybrid synchronization networks can encompass networks in which timing information (frequency or phase for example) is carried in some parts by the physical layer and in other parts carried by packet-based communication, as opposed to networks which do not use packets, or networks in which all information is carried by packets, even if the packets are carried over a synchronous physical layer.

References to synchronization sources can encompass any source of timing in a synchronization trail and can encompass PRCs for frequency, and primary reference time clocks PRTCs for phase information for example. These can be implemented by GPS (global positioning system), or atomic clocks for example.

These definitions can be extended where appropriate to encompass definitions of similar parts in standards such as the well known G.810.

References to synchronization transmission characteristics can encompass any kind of characteristics which have an effect on the transmission of the synchronization information, such as number of nodes passed, speed of links used, status of parts or links used, quality characteristics such as packet delay variation, nodes which regenerate the synchronization information, nodes which enhance the synchronization information, for example by making measurements en route.

Abbreviations
ASON Automatically Switched Optical Network
BMC Best Master Clock
ESMC Ethernet Synchronization Messaging Channel
LC Link Component
LMP Link Management Protocol
LSA Link-State Advertisement
MPLS Multi-Protocol Label Switching
OPS On-Path Support
OSPF Open Shortest Path First
PDV Packet Delay variation
PTP Precise Time Protocol
QoS Quality of Service
SSM Synchronization Status Message
SyncE Synchronous Ethernet
TE Traffic Engineering
TLV Type-Length-Value
WSON Wavelength Switched Optical Network As a preliminary to the description of embodiments, some issues with conventional features of synchronization networks will be explained, to facilitate understanding of features of the embodiments and how they complement or contrast features of existing networks.

Figure 14:
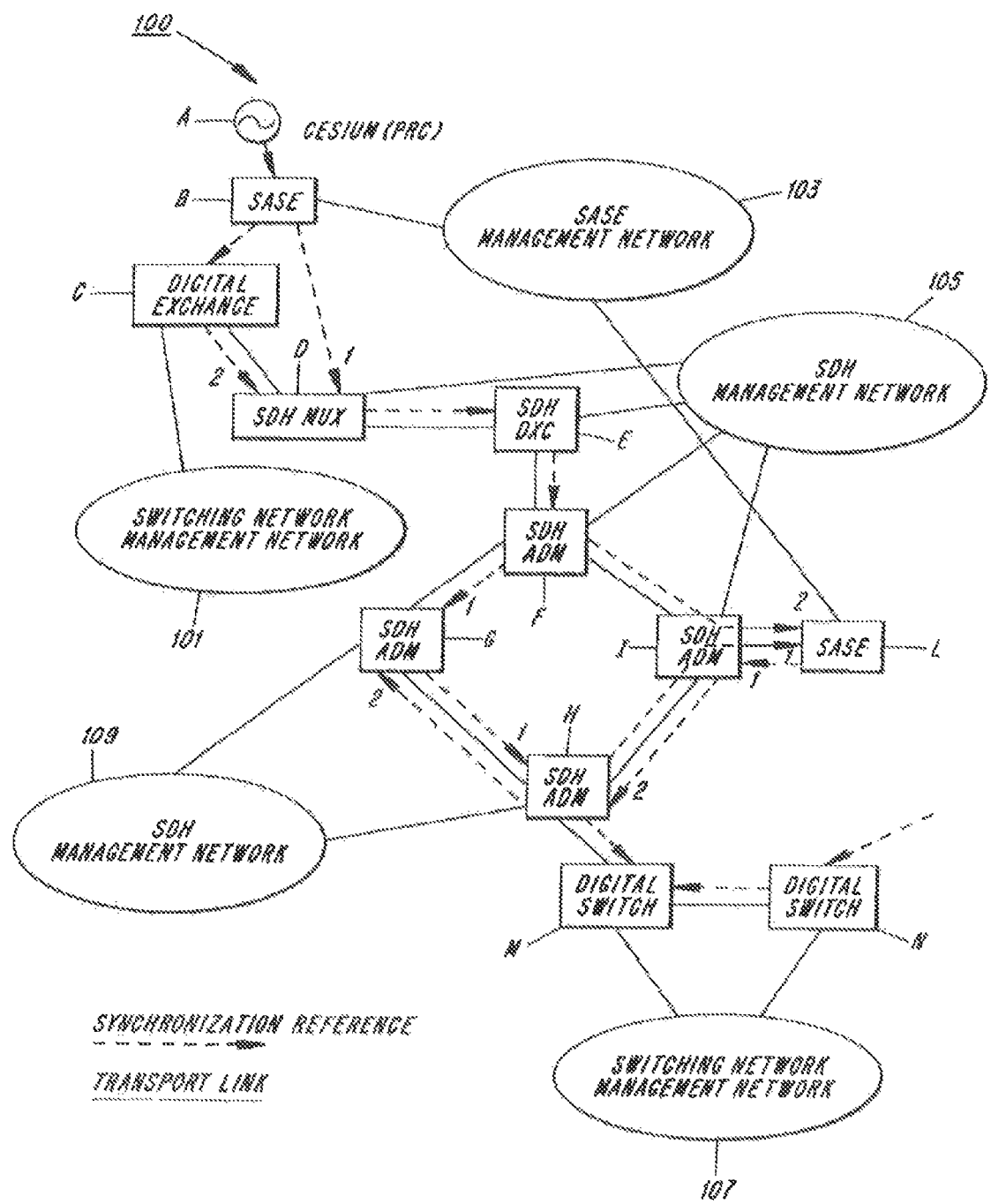
FIG. 14 shows a schematic view of a communications network and synchronization network.

FIG. 14, Communication Network and Synchronization Network

FIG. 14 shows a block diagram of a digital communication network 100 that includes a synchronization network. For purposes of illustration, the network 100 is a telecommunications network, and therefore includes, at network nodes, equipment that is well-known in the art. In the figure, transport links are indicated by solid lines, and synchronization trails for carrying synchronization information (the trails being made up of a sequence of reference links) are shown by dashed lines that include an arrow at one end to indicate the source and recipient of the synchronization information such as a reference clock signal. Where a node has the possibility of receiving a reference clock from more than one source, primary reference links (i.e., those synchronization links that are preferred to be used for supplying a reference clock from one node to another) are denoted by the number "1" next to the dashed line indicating the link. Secondary reference links (i.e., those synchronization links that are used when the primary synchronization link is unavailable) are denoted by the number "2" next to the dashed line indicating the link.

Where some of the reference links forming the synchronization trails are arranged to use packet based protocols, the synchronization network is known as a hybrid synchronization network. Such packet based protocols may be carried over synchronous physical layer links of the underlying transport network as shown in FIG. 14. An example showing more details of which links use packet-based protocols is set out in FIG. 1.

The network 100 utilizes the Synchronous Digital Hierarchy (SDH), which is a standard technology for synchronous data transmission on optical media. It is the international equivalent of the Synchronous Optical Network (SONET). To facilitate the following discussion, the various nodes of the network are given reference characters A, B, C, D, E, F, G, H, I, L, M, and N.

In a fully synchronized network, all sources should be ultimately traceable to a PRC. In the exemplary network, this is the PRC A. The PRC A supplies its high quality clocking signal ("clock") to node B which can be for example Stand Alone Synchronization Equipment (SASE) B. A SASE is a piece of synchronization equipment that contains a Synchronization Supply Unit (SSU), which is a high quality slave clock. The SASE B distributes its clock signal to node C which can be for example a Digital Exchange (or, in alternative embodiments, could be a Telephone Exchange). Node B can also feed node D, which can be for example an SDH multiplexer (MUX) D.

The SDH MUX D distributes its clock signal to an SDH Digital Cross Connect unit (SDH DXC) E, which in turn distributes its clock signal to an SDH Add Drop Multiplexer (ADM) F. The clock supplied by the SDH ADM F is then supplied to each of two more SDH ADMs G and I. The reference link between the SDH ADM F and the SDH ADM G is a primary link.

Rather than using the supplied clock signal itself, the SDH ADM I operates in a "bypass" mode (commonly named "NON-SETS locked", where "SETS" stands for "Synchronous Equipment Timing Source"), whereby the synchronization clock is merely forwarded directly to the SASE L. This is common when, for example, the ADM and SASE are implemented in the same building. Essentially, the SASE L is the real recipient of the synchronization clock supplied by SDH ADM F, and this clock is treated as a secondary link. The SASE L's primary link is supplied (through the SDH ADM I operating in "bypass" mode) by an SDH ADM H.

Despite its bypass function, the SDH ADM I does require a synchronization clock, and this is supplied by the SASE L.

The SDH ADM I supplies its synchronization clock to the SDH ADM H, and this is treated as a secondary link. The SDH ADM H's primary link is supplied by the SDH ADM G. To permit reconfigurability, the SDH ADM H is also coupled to supply a synchronization clock to the SDH ADM G, and this is treated as a secondary link by the SDH ADM G.

The SDH ADM H also supplies a synchronization clock to a digital switch M, which also receives a synchronization clock from the digital switch N. The remainder of the network is not shown, for the sake of brevity.

FIG. 14, Timing Loops

It is very important that the synchronization network be planned in such a way so as to avoid the occurrence of timing loops, both during normal operation as well as when a malfunction prevents one or more nodes from supplying their reference clocks to their planned recipient nodes. A timing loop is created when a clock is directly or indirectly synchronized to itself. In a timing loop situation, all the clocks belonging to the loop can show a large frequency offset compared to nominal frequency and are likely to be isolated from the rest of the synchronization network. To avoid timing loops, elements in a ring should be provided with means that enable the possible generation of timing loops to be discovered. Such elements are usually connected such that they each have at least two synchronization sources, so that when one source is discovered to cause a timing loop, there is at least the possibility of avoiding it by selecting one of the alternative sources. For example, suppose that the reference link between nodes F and G is cut. In this situation, the SDH ADM G will respond by looking to node H to supply the necessary reference clock. However, under normal circumstances, node H expects to receive its reference clock from node G. It is apparent that a timing loop will occur here unless node H also responds to the break between nodes F and G by looking to another source for its reference clock. It is important that the clock supplied by this alternative source also not ultimately be derived from the clock at node G or from the clock at node H in order to avoid a timing loop.

In SDH networks, the use of Synchronous Status Messages (SSMs) provides some help with avoiding timing loops. An SSM is a signal that is passed over a synchronization interface to indicate the Quality-Level of the clock that the interface is ultimately traceable to; that is, the grade-of-clock to which it is synchronized directly or indirectly via a chain of network element clocks (the "synchronization trail"), however long this chain of clocks is. In a fully synchronized network, all sources should ultimately be traceable to a PRC, and there is a predefined code to indicate this. Another code, "Do Not Use for Synchronization", is used to prevent timing loops and is transmitted in the opposite direction on interfaces used to synchronize an equipment's clock.

Although the SSM algorithm is a good concept in some applications like SDH or SONET rings, it is unable to guarantee that all timing loops will be prevented, because it only provides information about the quality of the traceable synchronization reference source, but not information about the actual physical source. See, for example, chapter 4.13 of ETS 300 417-6-1, "Generic requirements of transport functionality of equipment: Synchronization layer function". Another drawback of the SSM algorithm is that it is often not supported by SASE or by Network Elements other than SDH/SONET Network elements (i.e., it can only be used between SDH/SONET Network Elements).

It is noted that timing loops can cause severe disturbances in the traffic network, but that the effect of these disturbances very seldom gives a readily discernable indication of where the failure in the synchronization network occurred. It is therefore important to provide effective ways for managing synchronization networks so that, when failures occur in the network, it can be determined how to rearrange the network to maintain an acceptable quality of synchronization without creating timing loops.

FIG. 14, Configuration Management Issues

Current practice is for the management of synchronization networks to be distributed among several platforms. The reason for this is that a synchronization network very often consists of different types of equipment that can be either dedicated to synchronization (e.g., SASE), or to both synchronization and traffic (e.g., an SDH multiplexer or a digital switch). As a result, several management systems (e.g., one for the SASE network, one for the SDH equipment, one for the switching network, etc.) have to be maintained in parallel. This situation is illustrated in FIG. 14, in which a first Switching Network Management Network 101 manages the Digital Exchange at node C; a SASE Management Network 103 manages the SASE at nodes B and L; a first SDH Management Network 105 manages the SDH Mux at node D, the SDH DXC at node E, and the SDH ADMs at nodes F and I; a second Switching Network Management Network 107 manages the Digital Switches at nodes M and N; and a second SDH Management Network 109 manages the SDH ADMs at nodes G and H. This situation is not unrealistic, since the "same" type of equipment (e.g., an SDH ADM) may be manufactured by different vendors who design their equipment using incompatible equipment management strategies. Some or all of the management systems may be arranged to maintain a local map of neighbouring nodes and of different trails providing synchronization information from various sources to each of their nodes. These management systems would have to be individually configured with details of any changes outside their area of control.

By replacing the method of handling synchronization information at some of the nodes to use packet-based communication, the synchronization network becomes a hybrid network. A network where timing information is carried over packets allows the distribution of phase and time information as well as frequency information. Where some parts of the trails use packet-based communication, this can add a further complication to management of the configuration of the synchronization network, both at the initial planning or commissioning stage and ongoing configuration during the service life of the networks. This may involve continuous maintenance by maintenance personnel who may need to be physically present at the numerous sites of the different nodes. In most cases, this physical presence at each site is difficult and expensive due to geographical distribution of the synchronization network.

Features of the Embodiments

In order to address the issues above and with the purpose of reducing the related OPEX, one approach involves trying to add some level of automation into the sync network configuration process, from the initial planning, to the reconfigurations during operation of the synchronization network. A more drastic approach is to have the Control Plane of the communications network handle the configuration and the operation of the synchronization network. This is one of the features of some embodiments of the present invention. Other features to extend the conventional arrangements include a fully automatic synchronization network implemented by the Control Plane where in addition to a powerful synchronization operation (e.g., recovery after failure) the synchronization network can be auto-configured starting from the topology and other relevant information.

In addition the concepts can be applied to any type of synchronization methods, not only SDH/PDH but also new generation technologies such as IEEE1588 based synchronization networks. Furthermore some embodiments can address time synchronization in addition to frequency synchronization, and some embodiments can use OSPF extensions by definition of a TE Link LSA capable of carrying also synchronization information.

Some embodiments can have distributed management of the configuration of the synchronization network in which all nodes involved in the synchronization network exchange information in order to build a picture of the synchronization network itself and its sync trails. This can be used to maintain, it (e.g. select the synchronization reference according to predefined rules) and allow for appropriate reaction by reconfiguring when any topology change or network failure is detected.

This could be done either in a centralized or in a distributed manner: in the former case a network management central node takes care of distributing all necessary information and configuration commands. In the latter case each node maintains a database containing all the information relating to the entire network.

As will be described below in more detail, configuring a node of a hybrid synchronization network, can involve determining information about synchronization sources of a plurality of synchronization trails for passing synchronization information from the synchronization source to the node to provide a synchronization reference. After determining automatically synchronization transmission characteristics of trails which use packet-based communication, the trails are compared automatically, using their source information and their synchronization transmission characteristics, for selecting which of these trails to use for providing the synchronization reference for the node. Compared to selections made based on source alone, using the synchronization transmission characteristics of the packet based parts can enable a better choice of trail, and can enable comparison with synchronous type trails, which can help enable such hybrid synchronization networks to be configured and maintained.

Additional features of some embodiments can include the following: the step of determining synchronization transmission characteristics can comprise determining information about nodes used to pass packets used for the packet-based communication. This characteristic is likely to have the most influence on the quality of synchronization transmission by packet.

The step of determining information about nodes can comprise determining information relating to enhancement by any node of the synchronization information carried by the packets. Such enhancement can improve the quality of the trail and so can affect and improve the comparison of the trails. The step of determining information relating to enhancement can comprise determining information relating to regeneration of the synchronization information at another node (F) along the trail. Such regeneration can improve the quality of the trail and so can affect and improve the comparison of the trails.

The enhancement can comprise information about delays to the packets carrying the synchronization information, the delays being determined by another node (H) along the trail. Such additional information can be used by the node to improve the quality of the reference and so this can affect the quality of the trail and so affect and improve the comparison of the trails.

The information about delays can comprise any one or more of: delays internal to a node, delays between nodes, and amounts of delay variation. The method can have the additional step of determining information about synchronous parts of any trails leading to the node and using this information in making the comparison.

The step of determining the synchronization transmission characteristics can be carried out by the node, and the node can have a record of the synchronization trails to itself and to other nodes. Such distributed configuration management can enable more resilience to local or central equipment failures, and easier addition of new nodes, though centralized solutions may be more appropriate for larger networks to avoid slow propagation of changes.

The method can have the steps of receiving at the node an update of the synchronization transmission characteristics from a neighbouring node, reassessing the selection based on the updated synchronization transmission characteristics, selecting a new one of the synchronization trails for passing the synchronization information for use as the synchronization reference, and sending out updates to neighbouring nodes to indicate the updated synchronization transmission characteristics and the new trail selection. By covering ongoing reconfiguring, as well as initial set up, reductions in opex can be maximized.

The synchronization transmission characteristics determined by the trail manager can comprise information relating to enhancement by any node of the synchronization information carried by the packets.

The node can have a portion of a control plane for controlling a communication network synchronized by the synchronization network, the trail manager and the comparator being implemented by the portion of the control piano. This can be beneficial since such control plane infrastructure already exists and has visibility of topology and of changes that can affect the configuration of the synchronization network.

Some of the embodiments described can lead to a significant OPEX reduction in the deployment for new generation hybrid synchronization networks. This can be achieved via the definition of a new powerful mechanism integrated in the control plane able to handle various types of synchronization networks (both during the configuration and during the operation of the network).

They can be based on a mix of packet based and physical layer based methods and can in some cases provide frequency synchronization or time synchronization (or both).

Some of the characteristics described in more detail in the following section are listed as follows:

Distributed management of the synchronization network;
Extension of the automatic synchronization network handling to a mixed physical layer/packet based methods;
Extension of the automatic synchronization network handling to a mixed physical layer/packet based methods to support time synchronization;

Even though the distributed approach will be described first, the initial set-up of the network could be designed by the operator. Any reconfiguration during operation could be carried out autonomously, or alternatively, the automation may be also extended to some or all of the initial set-up of the sync network.

This is similar to what is defined in the above referenced IEEE1588 Best Master Clock Algorithm in the area of packet based synchronization: a signalling channel (Announce messages) is used to communicate between all the IEEE1588 nodes and, for each node, to define its role in the network and, for the slaves, to define their master.

FIG. 1 Example of Automated Synchronization Network

In FIG. 1, the synchronization network 200 comprises nodes, denoted A, B, C, D, E, F, G, H, I, L, M, and N, that are nominally linked together in a similar configuration to that of the synchronization network 100 depicted in FIG. 14. The synchronization network 200 is a hybrid network as some parts of the trails use packet-based communication. It is an example of a network having distributed configuration management, as it has at each node, the ability to route synchronization link state information throughout the synchronization network 200, so that each node in the synchronization network 200 can maintain complete information about the dynamic link status of the synchronization network 200 at any point in the network. In this exemplary embodiment, the synchronization network 200 further includes an Integrated Synchronization Network Management Network 201 that is capable of managing all of the nodes in the synchronization network. Provision of a centralised, integrated Synchronization Network Management Network 201 is not essential to all embodiments, since as explained above, this function can alternatively be distributed among the various nodes, which each have complete information about the trails of the synchronization network 200 and their dynamic link status in particular.

In FIG. 1, each node in the Synchronization Management Network is assigned an address (e.g., an IP address) that uniquely identifies that node. For purposes of convenience, the reference characters A, B, C, D, E, F, G, H, I, L, M, N, and O that are used herein to denote the nodes, will also be used herein to represent the respective addresses of those nodes. Each node further has a storage device that stores a table that defines the relationship between each node and other physical links in the Synchronization Network 200. In FIG. 1, this is represented schematically by the several configuration information diagrams 203. Some of the nodes are arranged to use packet based communication for parts of the trails. The links shown as using packet-based communication in this example are denoted by the following node-pairs EF, FG, GH, HM, MN, OF, FI, IH.

Figure 3:
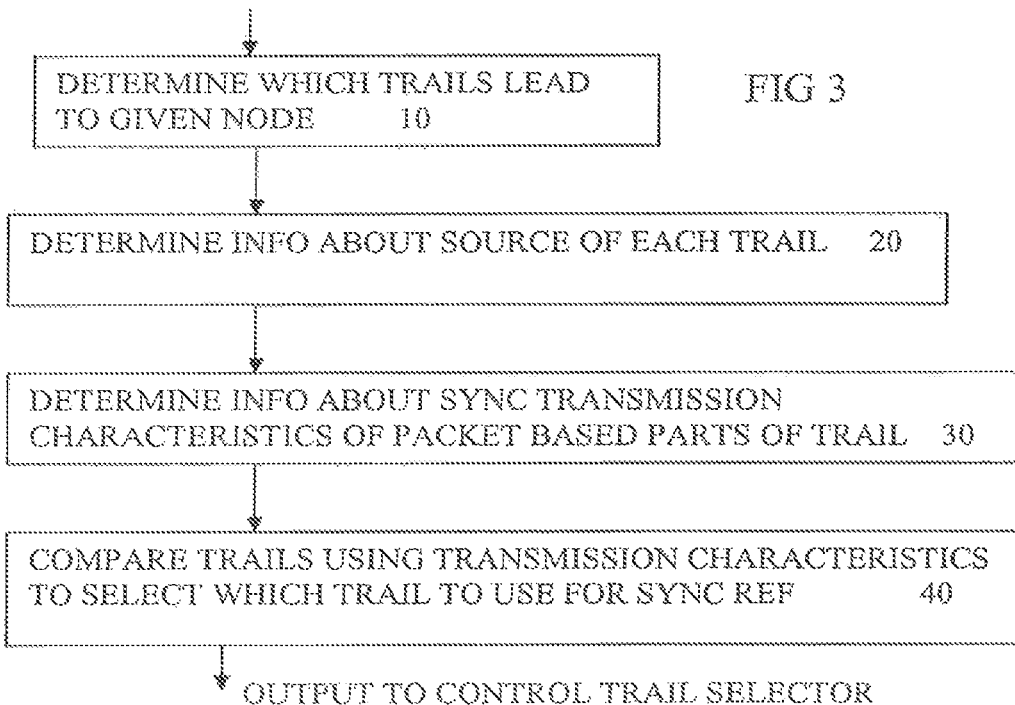
FIG. 3 shows some steps in configuring a synchronization network according to an embodiment.
Figure 2:
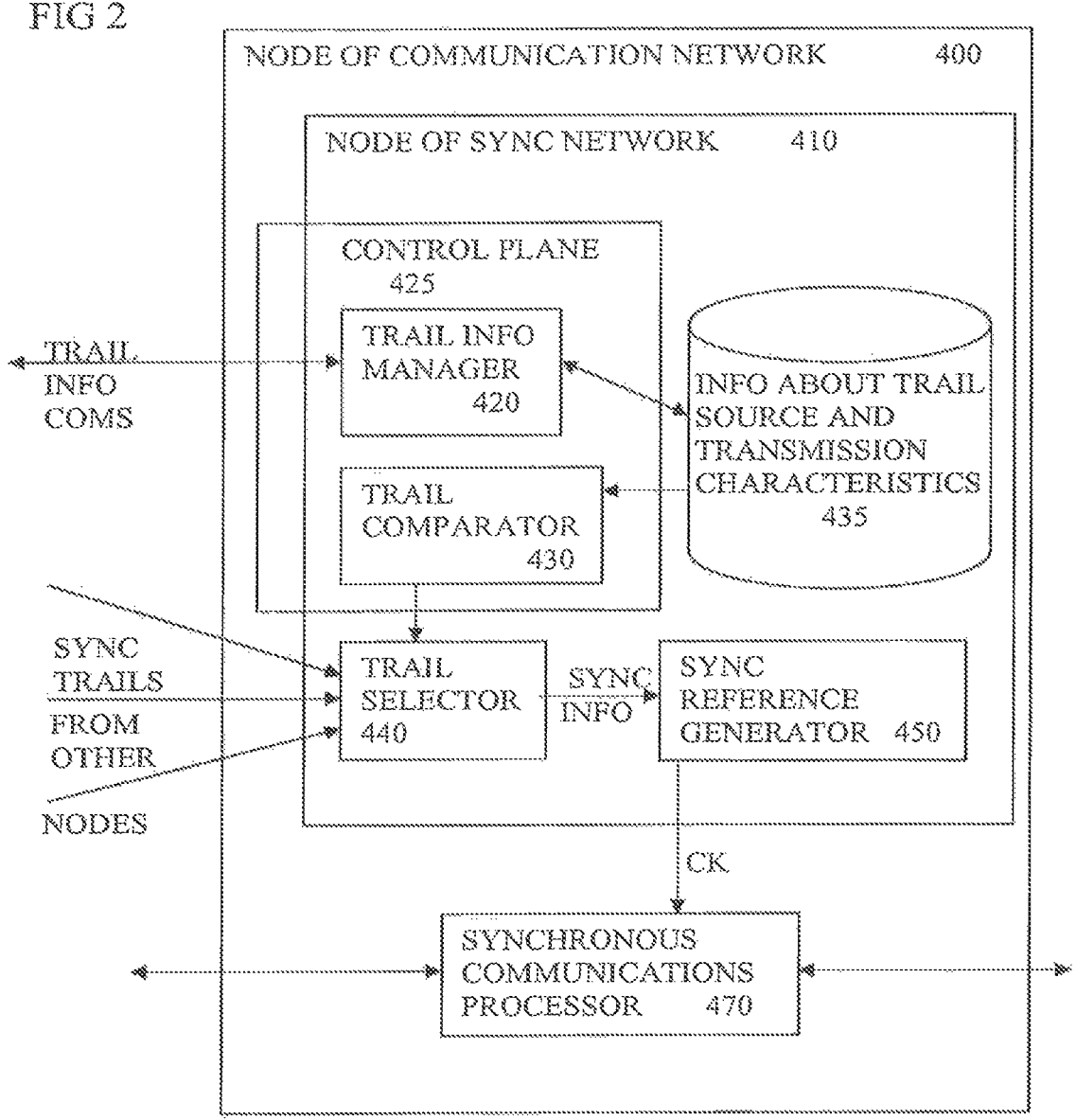
FIG. 2 shows a schematic view of a node of a synchronization network according to an embodiment.

FIGS. 2-3 Distributed Trail Selection

In the embodiments having management of configuration distributed across the nodes, the equipment at each node has an interface that is capable of supporting IP, and all such equipment is connected to an IP network. It is emphasized, however, that the use of IP standards is not essential, and that other telecommunication protocol standards could be substituted therefor, so long as those other protocols permit the communication of information between nodes as described below.

In some embodiments, each node further has a storage device that stores a table that defines the relationship between each node and other physical links in the Synchronization Network 100. In FIG. 1, this is represented schematically by the several configuration information diagrams 203.

FIG. 2 shows a schematic view of an example of a node. This shows a node 400 of the communications network. This contains a node 410 of the synchronization network, and other features not used by the synchronisation network, such as the synchronous communications processor 470. This is for processing the synchronous traffic on the transport links of the communications network following conventional practice. It is synchronised by the synchronization reference or clock, CK output by the node 410 of the synchronization network.

This node of the synchronization network has a trail selector 440 for selecting which one of the various synchronization trails leading to this node, is selected for providing the synchronization information. This synchronization information is used by the synchronization reference generator 450 in the usual way, to generate the clock. The trail selector is controlled by an output of the trail comparator 430. This output effectively governs the configuration of this part of the synchronization network, by controlling which of the trails is selected.

The trail comparator uses information about the source and about the synchronization transmission characteristics as stored in a database 435. A trail information manager 420 fills and maintains this database, by exchanging information with neighbouring nodes, about trails that they are aware of, as indicated by the "trail information coms." in the figure. In practice, this trail information about the sources and synchronization transmission characteristics of the trail can be carried over the same physical paths as used by the communications network, or used by the synchronization trails themselves, or can use independent paths. Similarly, the synchronization trails can use the same physical paths as the communication network traffic, or have independent paths. The trail information manager and the trail comparator can be implemented as software modules run by a general purpose processor for example, or can be implemented by software executed by separate hardware, as desired. The node may have a portion of a control plane 425 following conventional practice, spread across all nodes of the communication network, for distributed control of the traffic in the communications network. This same control plane can be adapted and used to implement the functions of the trail info manager and the trail comparator.

FIG. 3, Operational Steps in Configuring Synchronization Trials

First an overview of the operational steps will be described in general terms. The tables in each node are initialized to reflect the initial state of the synchronization network. This can be done by any node to node communications protocol as discussed above. Each node (including the Integrated Synchronization Network Management node, if one is included in the embodiment) now has a complete picture of trails indicating how reference clocks are propagated throughout the network. Next, the synchronization network is operated, using well-known techniques, to distribute synchronization reference clocks to each node along the trails. So long as there are no problems or other changes, this continues indefinitely.

However, whenever a change in status occurs at a node, the table in the affected node is updated. The node to node protocol is then used to propagate this information to all other nodes in the synchronization network, including the Integrated Synchronization Network Management node, if one is included in the embodiment. As updated information is propagated throughout the synchronization network, one or more nodes may respond with their own changes in status/configuration, therefore requiring further updates to the tables. Thus, through well-known iterative techniques, and the node to node protocol, the further updated information can be propagated to all other nodes in the synchronization network, including the Integrated Synchronization Network Management node, if one is included in the embodiment.

Eventually, no further changes are made at any nodes, and each node again has a complete picture of how reference clocks are propagated throughout the network. The synchronization network can then again be operated, using well-known techniques, to distribute synchronization reference clocks to each node. The above described techniques make it possible to completely carry out all of the synchronization network management functions in a unified manner yet distributed across the nodes, or under control of into a single (centralized) node. This is especially important now that new types of equipment (IP routers in particular) are starting to need to be controlled by a Synchronization Network Management Network as well.

FIG. 3 shows some of the steps in a method of configuring a node, either by a centralised management system, or in a distributed way at each node. At step 10, it is determined which trails lead to the node. At step 20, information about a source of each trail is determined. At step 30, information about synchronization transmission characteristics of packet based parts of each trail is determined. The determining of the synchronization trail information at each node can involve transfer of information between nodes regarding synchronization trails and status, or can involve looking up such information previously stored in the database. Different trails are compared at step 40, using at least the respective synchronization transmission characteristics and the source information, and optionally other information, to select which trail to use for providing the synchronization reference for the node. These steps can be implemented in hardware or software executed by a general purpose processor, as desired. More details of examples of how each of these steps of determining and comparing can be implemented, will be described below.

Trail Comparison and Selection Using OSPF Principles

With this trail information, the node (any network element) can define alternative synchronization sources without the risk of creating timing loops and in accordance to the network synchronization plan. Alternatively, as already mentioned, the process could use some more advanced mechanisms where the network element chooses the most convenient synchronization reference based on some appropriate algorithm (for instance minimizing the length of the trails). An output indicating which trail to select is sent to control a trail selector at the node. In this context, although not illustrated, the selector can of course include an internal trail from an internal sync generator which of course need not pass through any other nodes, or over any links between nodes, in which case the trail can be represented simply by an indication that the trail is internal.

An example of a process for such selection of trail can use the principles used in the OSPF (Open Shortest Path First) protocol, as shown for example in U.S. Pat. No. 6,711,411 B1 "Management of Synchronization Network"—Stefano Ruffini, Mar. 23, 2004. The OSPF can provide a fast reaction in case of changes in network topology and flexibility in rearranging the network based on proper optimization algorithm. Via an extension of the OSPF protocol all nodes in the synchronization network have information on the synchronization links status of the overall synchronization network.

The basic principles are applicable to the network synchronization application. It is assumed that each node must have assigned a unique address.

The automated determination of information about the trails of the sync network from other nodes can use principles that are known in connection with link state routing protocols such as the Open Shortest Path First (OSPF) data routing protocol. These principles can be advantageously applied in the present invention relating to synchronization network management because they provide for fast reaction in case of changes in network topology, small overhead traffic, and flexibility in rearranging the network based on proper optimization algorithms.

This is not to be understood to mean that the conventional link state routing protocols are necessarily useful for managing synchronization networks—they are not if, for example, they do not provide for the exchange of data pertinent to the synchronization network management functions (e.g., data pertaining to synchronization trails and status). However, the OSPF routing protocol enables all routers in an IP network to have a complete picture of the IP network for purposes of being able to route each data packet from its source node to its intended destination node, and it will now be described how these concepts are usefully applied to facilitate the management of synchronization networks.

In OSPF, providing all routers with a complete picture of the IP network is accomplished by having each router send updates of its link state (i.e., information about changes in the status of connected links) to other neighbouring routers in the IP network. In a recursive way, the same information is spread throughout the network, until each router has the information, and can create a complete picture of the IP network that can be used in the routing of IP packets.

Messages Used for Inter Node Exchange of Trail Info

In accordance with at least some embodiments of the invention, a similar approach can be used to provide each node in the Synchronization Network with complete information about the link status of all of the other nodes in the Synchronization Network. To do this, the information needed is the active synchronization reference and its status that is, the identity of the traceable synchronization source and its quality; and the identities of the stand-by (back-up) synchronization references and their status.

A number of messages are required in order to distribute the information between the nodes. Similarly to what is specified in OSPF the following types of messages are needed:

- (Sync) Hello—to periodically inform the connected nodes of the sender's synchronization status;
- (Sync) Database Description—to inform about the active and stand-by synchronization references and their quality status in the initialization phase;
- (Sync) Link State Request—to update the synchronization data, e.g., after the database description has been received by a node and its own database is found to be out of date;
- (Sync) Link State Update—to inform other nodes of changes in the synchronization status;
- (Sync) Link State Acknowledgement—to acknowledge the receipt of a Link State Update.

Note: all these messages are sent to the adjacent nodes. All nodes in the network, however, recursively receive the information.

If messages are received from nodes that are not neighbours (according to the topology information owned by the receiving node), these are discarded. The list of neighbouring nodes is formed via the (Sync) Hello messages. At network set up this may also be defined by the network management node in order to speed up the set up process.

Additional messages are needed for the provisioning and set up of the network, e.g.:

- A command to set up which reference should be accepted as a candidate synchronization reference;
- A command to set the priorities for the different references;
- One or more commands to set up thresholds for supervisions parameters, if any. The sequence of steps in managing such a network could be summarized as follows:
- The nodes are configured from a centralized system with some basic information (e.g. priorities for masters and in general the information on sync network topology as defined by the operator),
- Tables in each node are updated using the (Sync) Hello and (Sync) Database Description messaging. This corresponds to steps 20 and 30 of FIG. 3, mentioned above. Each node (or in some cases only a centralized node) has a complete picture of the synchronization network;
- The network is operated accordingly;
- When a change occurs at node X, table of this node is updated (again corresponding to steps 20 and 30), the selection of the trail for that node may be reassessed (corresponding to step 40 of FIG. 3), and the new information is propagated to all other nodes in the network (including the centralized node) via the (Sync) Link State Update messaging;
- As information is propagated throughout the network, one or more nodes may respond with their own changes, thus further requiring changes in table of node X. The iterative process will eventually result in a new status of the synchronization network.

A further example having some similar steps is shown in FIG. 5 described below. In the case of a fully automated network, the initial configuration can include only basic data (such as the name and location of the master(s)) and other constraints defined by the operator. The trail selection (also called synchronization reference selection) performed by each node can be carried out according to some iterative process (similar to the case of recovery after failures in the network) and based on some appropriate rules and algorithms.

FIG. 4, Packet Format and State Tables

An example of database information owned at a certain point in time by each node is shown in FIG. 4. This full table can be forwarded in the (Sync) Database Description messages to the adjacent nodes. The (Sync) Link State Update would usually only include the portion of the table that is requested in the (Sync) Link State Request (e.g. the rows that concern a specific node). The (Sync) Hello packets can include information on the sender status only (e.g. status of the connected sync links).

The table has a number of rows for each of the nodes shown in FIG. 1 in this example, each row corresponding to a different trail leading to each node, or to an internal trail for that node. In a first column 301 of the table, each of the nodes in the Synchronization Network 200 is defined. For each of these nodes, an entry in a second column 303 of the table identifies the node's source of synchronization. For example, node A is a PRC (refer to FIG. 1 or 14), and thus has no other source. Node B has a link to receive synchronization from node A, and this is indicated in the second column 303. Moreover, for node B this is the preferred source of synchronization, so in a third column 305 of the table, there is an indication that this source is to be given highest priority (e.g., priority "1").

Many nodes have more than one possible source of synchronization. For example, node B has a link to receive synchronization from node A, as indicated above, but also has an internal clock that it can alternatively use as a synchronization reference. Each of these is assigned a relative priority that indicates an order of preference of use of these possible synchronization sources. So, for example, node B's highest priority synchronization reference is received from node A, and its next highest priority synchronization reference (in this case, priority "2") comes from node B's own internal clock.

A fourth column 307 in the table indicates the succession of nodes through which the synchronization reference can be traced. For example, node A is a PRC, so there are no nodes through which its synchronization reference is derived. For node B, the synchronization reference is traceable to node A when the highest priority reference (i.e., the one provided by node A) is used, and alternatively traceable to B itself when B's own internal clock is used. The parenthesis is used in the fourth column to indicate when a Node is part of the sync over packet chain but is only forwarding the timing packets, not processing them or enhancing them.

A fifth column 309 indicates for the network element, the status of the corresponding synchronization reference. Possible states include: "Network PRC (G.811)"; "locked (G.811)"; "stand-by (G.812)"; and "stand-by (G.813)", the latter being a lower quality clock than that defined by G.812. These states are well-known in the art, and are defined, for example, in ITU-T recommendation G.811 (2/97), "Timing characteristics of Primary Reference Clocks"; and ITU-T recommendation G.812 (2/97), "Timing characteristics of Slave Clocks"; and ITU-T recommendation G.813 (8/96), "Timing characteristics of SDH Equipment Slave-Clocks (SEC)", all of which are hereby incorporated herein by reference in their entireties.

A sixth column 311 indicates whether the trail has a packet-based part, or whether it is carried by synchronous links. A seventh column 313 in the table indicates a Supervision Result, such as: Maximum Time Interval Error (MTIE), Time Deviation (TDEV), Frequency Deviation (FDEV), and the like. In case of a packet based link, this could be a PDV measurement. PDV measurements are under consideration as part of standard G.8261. These Supervision Results are the result of usually periodical supervision, and are set by the routine in the network element performing the supervision tests. These results may be read by the operator to check the quality of a synchronization network, but may also be used by the synchronization network in an automatic manner in order to reconfigure the synchronization network (e.g., in case a link exhibits poor quality). The Supervision Results MTIE and TDEV are well known in the art, and are defined in ITU-T recommendation G.810 (5/96), "Definitions and terminology for synchronization networks", and so need not be described here in more detail. The Supervision Result SSM is also well known and is defined in the above-referenced ETSI document EG 201 783. Frequency Deviation is also a well-known concept, and need not be defined here.

An eighth column 315 indicates node functions, of nodes along the trail which might affect the synchronization transmission characteristics. This enables the table to include some synchronization transmission characteristics of parts of the trails using packet-based communications.

FIG. 4, Synchronization Transmission Characteristics for the Packet-Based Part The main difference between physical layer based communication and packet based communication (for example, timing carried via IEEE1588 (PTP) packets) is that in the former case the synchronization is distributed and regenerated by all network elements that are part of the synchronization network. In the latter case the timing is distributed from a master to a slave, and the intermediate nodes may or may not be required to handle the timing (e.g. via regeneration). Another fundamental difference is that from a slave perspective the stand-by reference can be defined on a master clock basis and not on a link basis as in case of the traditional physical layer synchronization methods.

This means that different information needs to be exchanged between the nodes, for the packet-based parts of the trails, and the trail comparison step needs to be able to take account of this new information. In some embodiments, a single unified management protocol running over the control plane can handle at the same time different types of synchronization networks (e.g. SyncE and IEEE1588), though in principle, the different types of information for the packet-based and synchronous parts could be gathered by different protocols, optionally stored in different places, and both places accessed by the trail comparator to enable the different types to be compared.

The following cases of packet-based communication can be identified:
Full packet based network running over a connection-oriented packet network;
Full packet based network running over a connection-less packet network;
Mixed physical layer/packet based network The packet based method can also be deployed with or without timing support of the network (e.g. timing packets regenerated or modified in all or some of the network nodes along a trail).

The connection-less scenario will not be discussed in detail, because delays are less predictable. Some QoS mechanism over pre-defined paths can be used to make the delays more predictable. The nodes that are part of the packet-based parts of the synchronization network could be of the following types for example (other types may be envisaged):

Nodes only forwarding the timing packet (and therefore adding some packet jitter);
Nodes regenerating the time (e.g. IEEE1588 Boundary Clock); this is very similar to a physical layer based clock (e.g. in terms of stand-by references, clock quality etc.), see FIG. 4, first trail leading to F;
Nodes which enhance the packet data (e.g. IEEE1588 Transparent Clock nodes), to enhance the data to indicate delay values detected at the node, see for example FIG. 4, trail leading to H; and
Nodes defined by the routing protocol as an alternative path in case of failures in the network (in this case, some interaction with the routing protocol data (e.g. OSPF LSA) could be used in order to get a picture of the available routing paths).

These different types of nodes can affect the timing of the synchronization information being carried by the packets, and so information about these nodes can represent synchronization transmission characteristics of the trails. The trail comparison and selection mechanism in this context can be extended to take into account for example transmission characteristics such as number of nodes in the trail, number of nodes that are not providing timing support, number of Boundary Clock nodes, number of transparent clock nodes and so on.

In case of a mixed physical layer/packet based methods, this information can also be added by each node. The comparison and selection mechanism can also consider other factors such as the reliability of one method vs. the other (in particular a physical layer based method is not impacted by packet delay variation and could be considered as a first priority).

The data exchanged between the nodes and with the management network, can therefore include the above information.

In order to avoid excessively large tables, the synchronization network can optionally be divided up into parts, with each part containing only data for a related subset of the entire synchronization network.

FIG. 5, Steps Using the Synchronization Transmission Characteristics

FIG. 5 shows a flow chart of steps involved in configuring the synchronization network according to an embodiment. At step 200, a node is added to the hybrid synchronization network. Step 210 involves starting configuration of the node by communicating with other nodes to exchange information to determine trails leading to the node. This can involve for example obtaining a copy of the table of FIG. 4 from other nodes, or filling in the rows of such a table by requesting information from other nodes. At step 220 source information is determined for each trail, and at step 230 synchronization transmission characteristics are determined. This can involve for example obtaining from the other nodes, or from a central location, information to fill in columns two and eight of the table of FIG. 4, for the rows corresponding to the node in question. Other ways of obtaining or storing such information can be envisaged.

At step 240, the trails leading to the node are compared, using the source information and the synchronization characteristics, to select which trail to use. Some ways of implementing this step are described in more detail below with reference to FIGS. 6 to 9. Optionally the new selection is recorded, optionally in the priority column of the table, and if second and third priority levels and so on are determined for the remaining trails, these priorities can also be recorded. This can enable the node to switch to a back up trail instantly if needed, without a full reassessment of the priorities.

Step 250 shows normal operation of the synchronization network to provide a synchronization reference for the corresponding node of the communications network as shown in FIG. 2 for example, based on synchronization information passed from a remote synchronization source over the selected trail. At step 260, the trail information is periodically updated, perhaps as a result of a fault or alarm condition, or reconfiguration of any part of the communications network. This can be by exchange of information between nodes, as described in more detail below.

Updating the Database Table Avoiding Timing Loops

The discussion will now focus on how the contents of the table are modified in the event of a failure in the synchronization network. Suppose that a malfunction (e.g., a break in a cable) occurs that renders the synchronization link between nodes F and G inoperative. This means that node G will have to obtain synchronization from another source, and in order to avoid timing loops, other nodes may need to be reconfigured as well. This can be coordinated by utilizing a protocol to distribute table updates, so that each node (including the one associated with the Integrated Synchronization Network Management network 201) will have complete information upon which to base reconfiguration decisions. The information changes piece-wise, so a number of updated tables are created and distributed in succession.

For example, after detecting the loss of its synchronization source, node G would examine its own table and discover that it cannot immediately select to receive its synchronization reference from node H, since this would cause a timing loop. (The table shows that the node H's source is traceable to node G.) So, node G opts instead to receive its synchronization reference from its own internal clock. Node G updates the table 300 to reflect this change, and distributes it to the other nodes in the synchronization network. As the table is distributed from node to node, changes are made in a piecemeal fashion to adjust to the previous changes. In particular, if a Supervision Result indicating "ALARM" has been generated in Node G for example as a result of the supervisor detecting something not working, such as Loss of Frame, or MTIE exceeding a certain threshold, then this "ALARM" in turn causes Node G's highest priority link to transition from a "locked" state to a "FAILURE" state. In response to this failure, Node G's third priority synchronization reference source now transitions from a "standby" mode to a "locked" state (meaning that it is being used by node G). This highlights the fact that in the reference selection algorithm, the condition of avoiding timing loops is given greater importance than choosing the reference having the highest priority. A further consequence is that node H will change to show a transition in quality from a G.811 quality reference to a G.813 quality reference.

Figure 6:
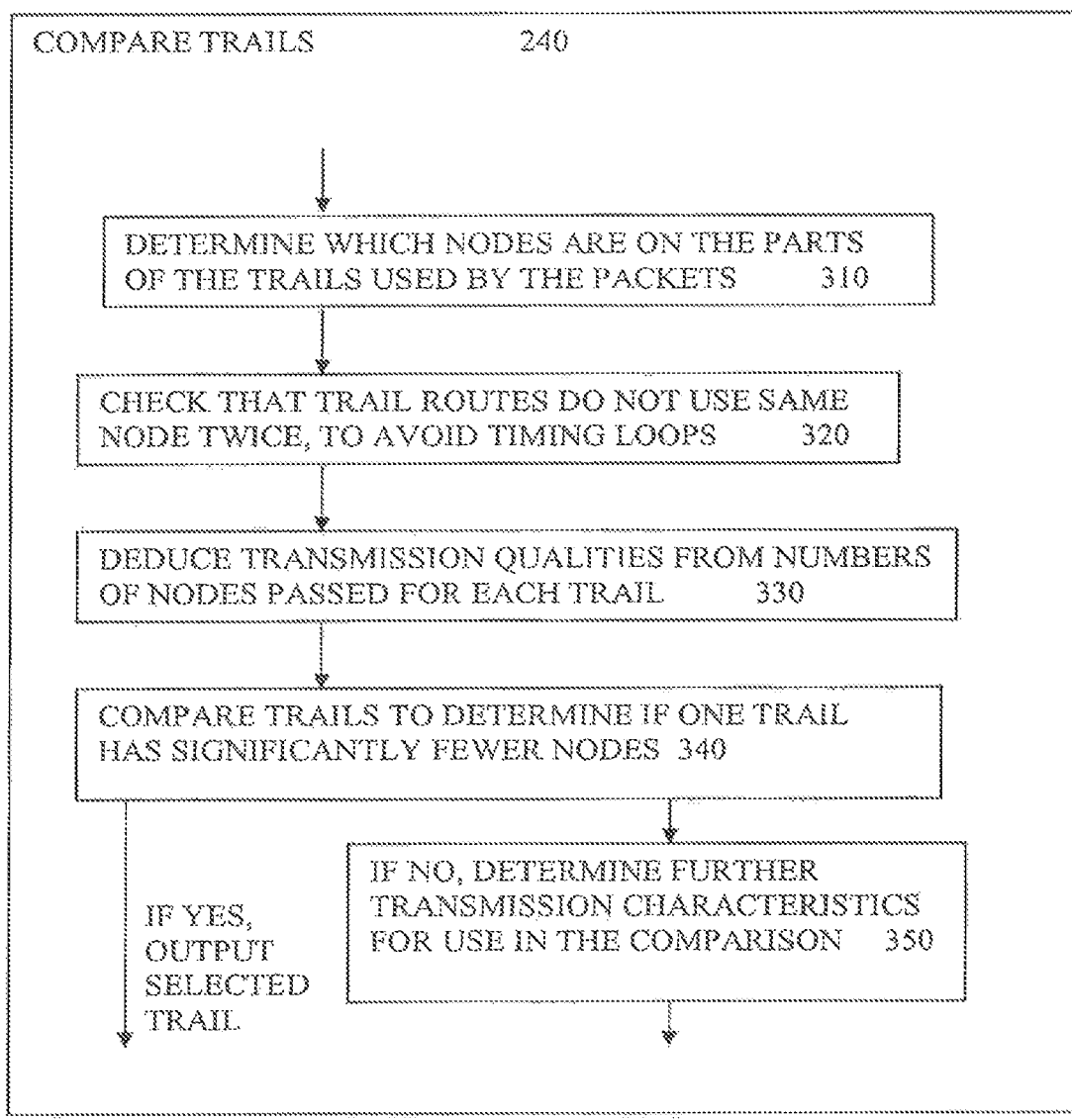
Figure 7:
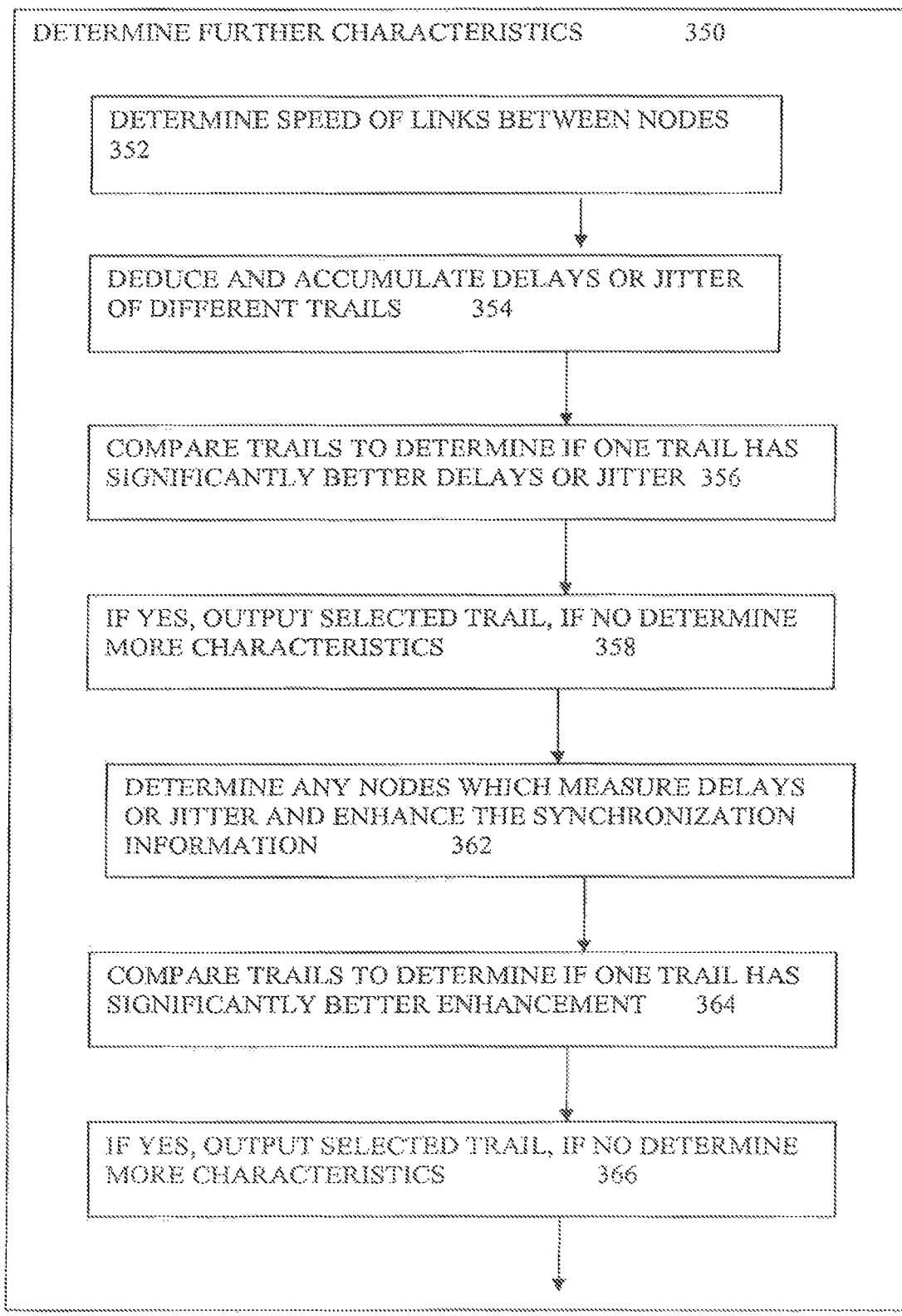
Figure 8:
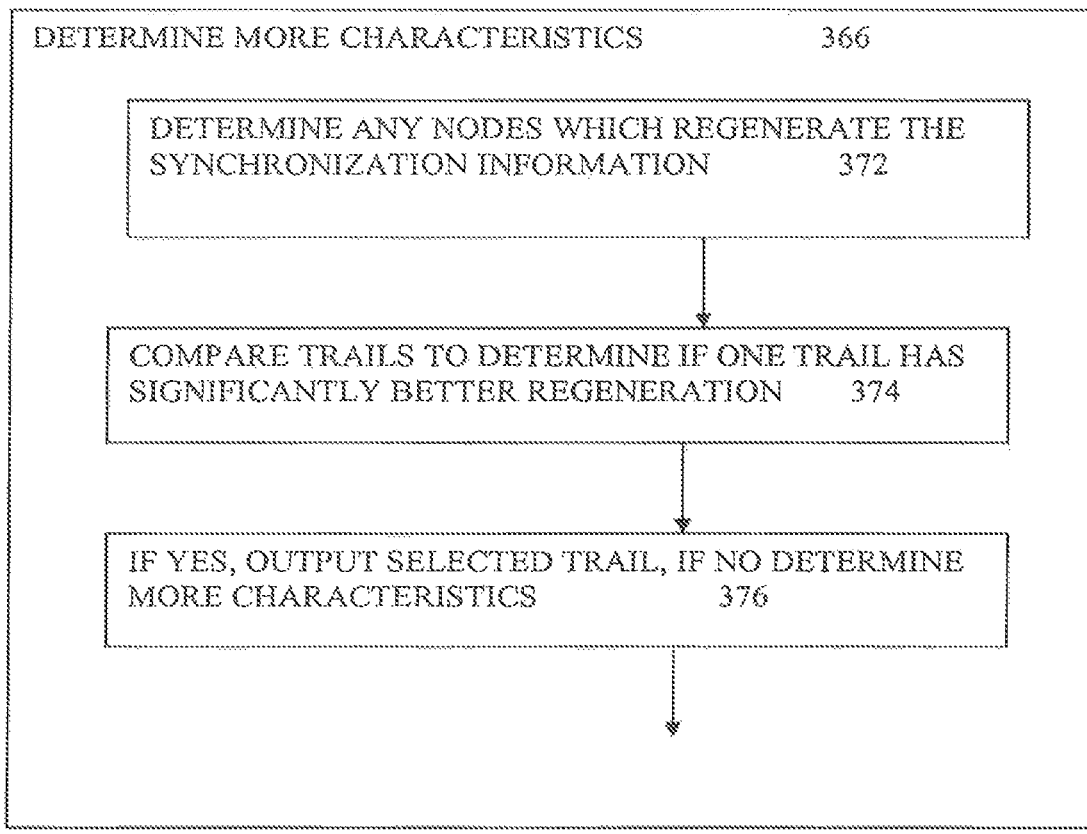

FIGS. 6-8, Comparing Trails

FIG. 6 shows some steps involved in one possible implementation of step 240 of FIG. 5. As shown, a first step, 310 is determining which nodes are on the parts of trails using packet-based communication. At step 320 a check is made that each of the trail routes does not use the same node twice, to avoid timing loops. At step 330, a number of nodes in each of the trails is determined and used as a measure of transmission quality. This can involve for example using column 4 of FIG. 4, to determine which nodes are passed, and using column eight of FIG. 4 to determine which of those nodes are in the packet-based part of the trail.

At step 340, the trails are compared to determine if one trail has significantly fewer nodes. A threshold can be applied, depending on how many trails are being compared for example, or depending on the lengths of the trails. If the shortest trail has say less than 10 nodes, it will be selected, otherwise if the shortest trail has 20% fewer nodes than the second shortest trail, then it can be selected. Many other similar algorithms can be envisaged. The comparison can include the source characteristics as a factor, if the sources have different qualities, such as jitter, or reliability if no trail is clearly optimal, then at step 350, further synchronization transmission characteristics can be determined for use in the comparison.

FIG. 7 shows at step 352 determining a speed of links between nodes. This is not shown directly in the table of FIG. 4, but can be determined in various ways, by a request to either a central database or a local store in the node indicating the network topology and details of the data rates of links between nodes. The request can identify the links based on which nodes are involved. As in step 330, which nodes are passed can be obtained for example by using column 4 of FIG. 4, to determine which nodes are passed, and using column eight of FIG. 4 to determine which of those nodes are in the packet-based part of the trail.

At step 354, delays and or jitter can be determined and accumulated for each of the trails, based on the information about the speed of the links. At step 356, the trails can be compared based on their accumulated totals, to see if one trail is significantly better than the others. Again suitable thresholds can be used as discussed above, to determine by what degree or amount a trail must exceed its rivals to be selected. At step 358 a selected trail is output, or if the best trail does not meet the threshold, then further characteristics are determined.

For example, at step 362, it is determined how many nodes in each trail act to enhance the synchronization information. This can be based on the node function information in the eighth column of FIG. 4, described above, to see if there are any nodes which enhance for example by measuring actual jitter or delays along the trail, to enable compensation or at least enable assumptions of these values to be replaced by actual values. At step 364 again trails are compared to see if one trail is significantly better than the others. Again suitable thresholds can be selected. If the best trail meets the thresholds, it is selected and a suitable output made to the trail selector, otherwise more characteristics can be determined at step 366.

FIG. 8 shows at step 372 determining any nodes which regenerate the synchronization information, such as boundary clock nodes. Again this can be based on the node function information in the eighth column of FIG. 4, described above. At step 374 again trails are compared to see if one trail is significantly better than the others. Again suitable thresholds can be selected. If the best trail meets the thresholds, it is selected and a suitable output made to the trail selector, otherwise more characteristics can be determined at step 376. Such other characteristics could be other transmission characteristics such as reliability, or other factors.

Figure 9:
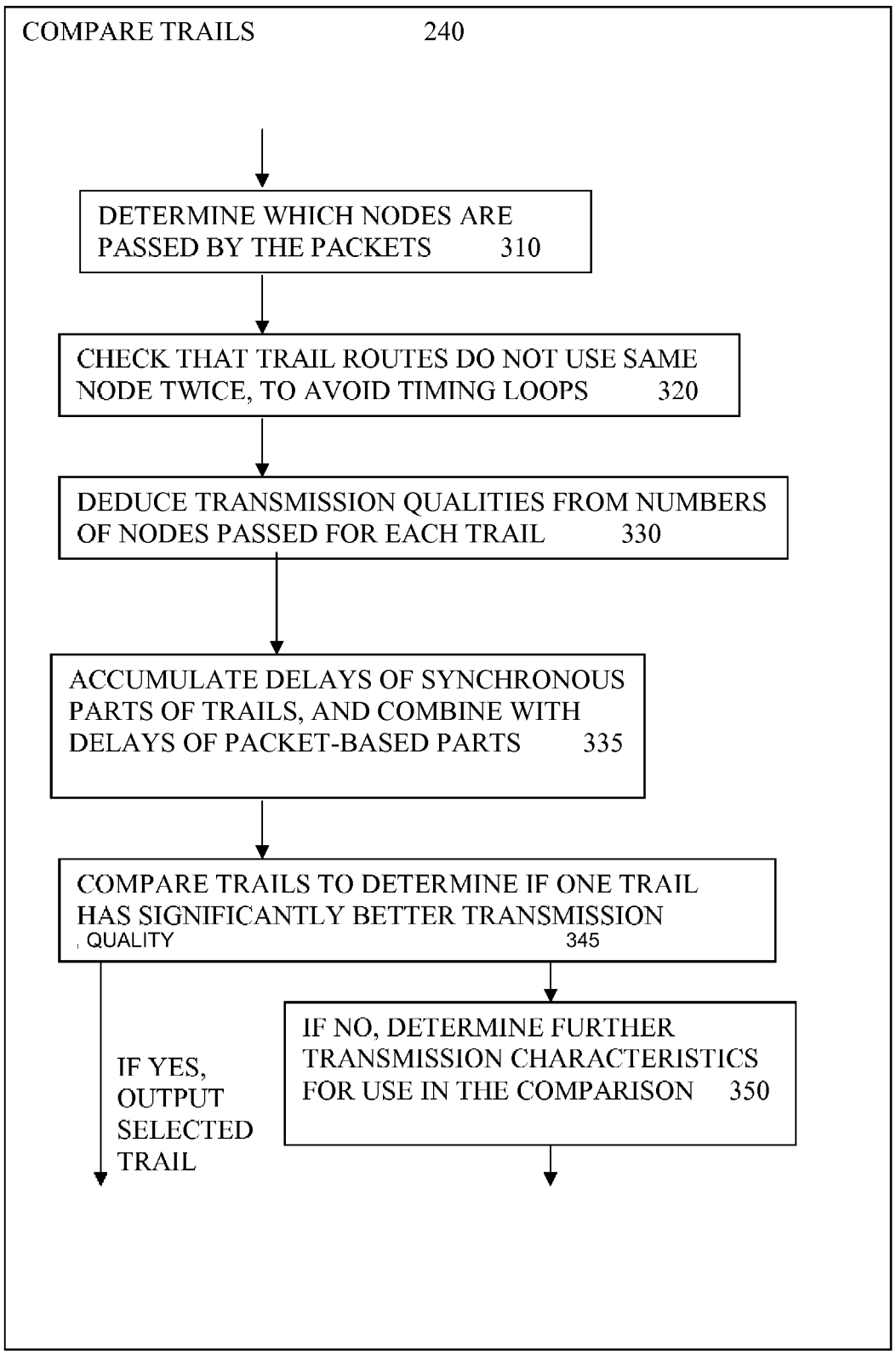

FIG. 9, Comparison Involving Combining Synchronous and Packet-Based Parts

FIG. 9 shows a similar series of steps to those of FIG. 6, but with the additional step of combining synchronous and packet-based parts. As in FIG. 6, it shows some steps involved in one possible implementation of step 240 of FIG. 5. As shown, a first step, 310 is determining which nodes are on the parts of trails using packet-based communication. At step 320 a check is made that each of the trail routes does not use the same node twice, to avoid timing loops. At step 330, a number of nodes in each of the trails is determined and used as a measure of transmission quality. This can involve for example using column 4 of FIG. 4, to determine which nodes are passed, and using column eight of FIG. 4 to determine which of those nodes are in the packet-based part of the trail. At step 335, delays (or other characteristics such as jitter) of packet-based parts of each trail are combined with accumulated delays of any synchronous parts. This can be based on numbers of nodes or other measures of delays or jitter.

At step 345, the trails are compared to determine if one trail has significantly better transmission quality (such as fewer nodes). A threshold can be applied, depending on how many trails are being compared for example, or depending on the lengths of the trails. If the shortest trail has say less than 10 nodes, it will be selected, otherwise if the shortest trail has 20% fewer nodes than the second shortest trail, then it can be selected. Many other similar algorithms can be envisaged. If no trail is clearly optimal, then at step 350, further synchronization transmission characteristics can be determined for use in the comparison.

Figure 10:
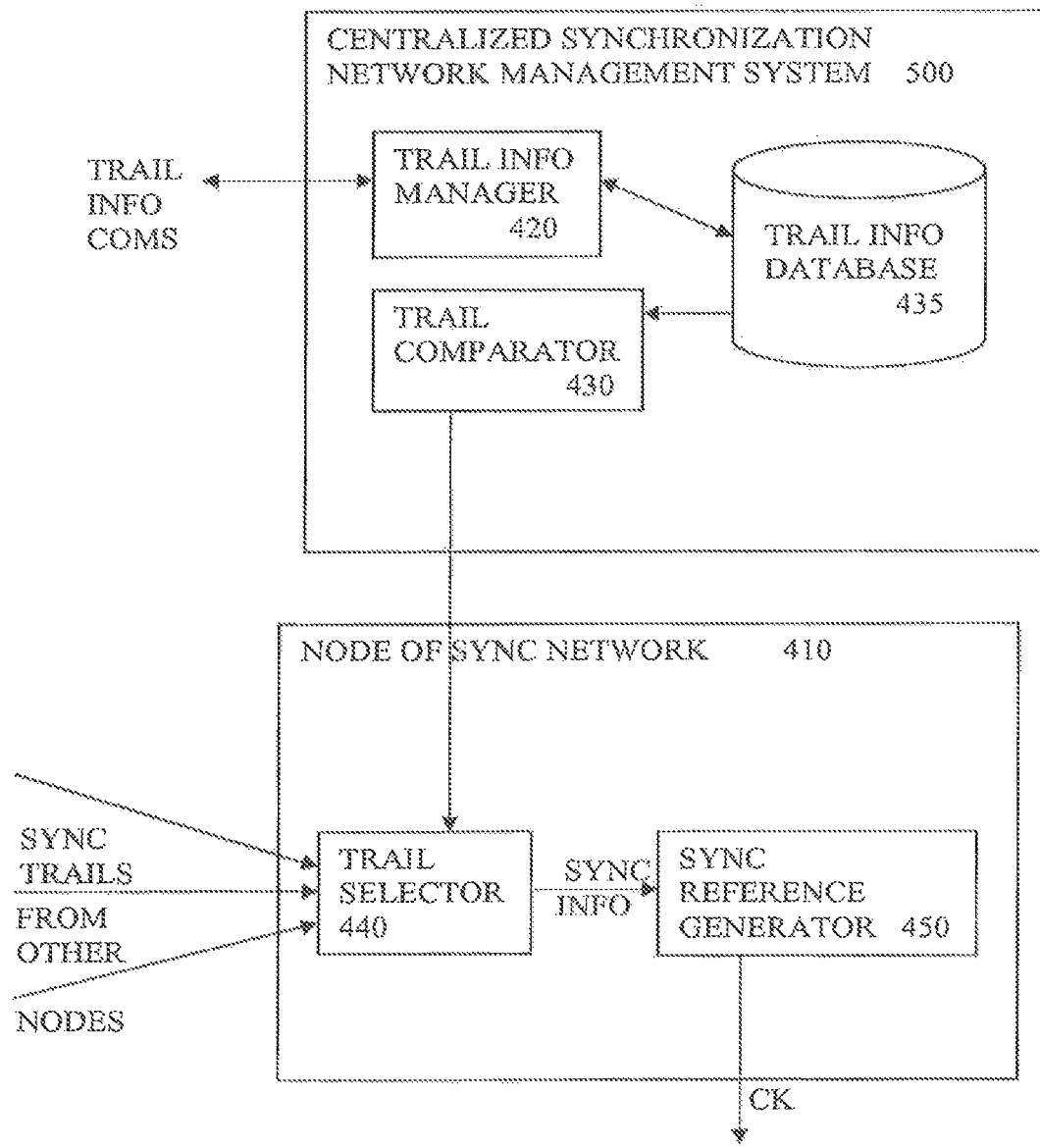
FIG. 10 shows a schematic view of a node of a synchronization network, and a centralized synchronization management system according to an embodiment.

FIG. 10, Centralised Trail Comparison

FIG. 10 shows an example showing similar features to those of FIG. 2, but differing in that the functions relating to configuration, such as trail comparison, are carried out centrally. The figure shows a centralised synchronization network management system 500, having a trail info manager 420, a trail info database 435, and a trail comparator 430.

There is a node 410 of a synchronization network, which outputs a synchronization reference or clock, for use by synchronous parts of a communications network. This node of the synchronization network has a trail selector 440 for selecting which one of the various synchronization trails leading to this node, is selected for providing the synchronization information. As in FIG. 2, this synchronization information is used by the synchronization reference generator 450 in the usual way, to generate the clock. The trail selector is controlled by an output of the trail comparator 430 from the centralized synchronization network management system.

The trail comparator uses information about the source and about the synchronization transmission characteristics as stored in the database 435. The trail information manager 420 fills and maintains this database, by obtaining information from all the nodes in the synchronization network. An advantage of centralising these functions, compared to having them distributed across all the nodes, is that delays in propagating information across large networks can be reduced. Also, it is easier for operators to intervene in the centralised version. Conceivably the trail info database could be held centrally, and the trail comparator algorithm carried out locally at each node. This would spread the computational resource demands, but increase the communications requirements between the nodes and the centralised database.

FIG. 11, Example of Choice of Trails in a Mixed Physical Layer/Packet Sync Environment FIG. 11 shows a hybrid synchronization network similar to that of FIG. 1 (but not identical, for example node G is a transparent clock node in FIG. 11). In FIG. 11, two trails are shown leading to node N. A first trail highlighted by a dashed line passes from O via F, I, H and M. A second trail highlighted by a solid line passes from E via F, G, H and M. Both trails have the same number of nodes, and so cannot be distinguished on that criteria alone, as per the steps shown in FIG. 6. Nevertheless, the trails can be distinguished using step 362 of FIG. 7. The second trail offers better timing support because it passes node G which is a transparent clock node, rather than node I which does not process the packets at all. This would be apparent in the last column of the table of FIG. 4, if FIG. 4 were amended to correspond to the network of FIG. 11.

Extension to Time-Phase Synchronization

The time (and/or phase) synchronization application typically implies a synchronization network using a packet based method. In some cases a solution could be designed where the packet based method get support from an underlying physical layer method that is used to distribute frequency synchronization (this is sometimes referred to as "On-Path-Support", OPS).

In addition to the need for a time (or phase) reference, the main difference between a packet based method which is used to distribute frequency from a method that also distribute time, is related to a need for a two-way protocol. That is the timing packets are sent from master to slave and from slave to master. Another characteristic is that in order to deliver accurate time, support from the network nodes (e.g. IEEE1588 Boundary Clocks) would be required in many significant network scenarios.

Assuming that the two-way protocol is deployed with the downlink timing flow distributed over the same nodes as the related uplink flow, the extension of the discussions presented in earlier sections is straightforward.

In case of a time synchronization network getting support from a physical layer synchronization method the additional information on OPS availability is considered. In this case the node has to maintain in parallel two sync Databases: one for frequency synchronization distribution and the second one for time synchronization distribution.

The distributed approach is preferred as it can guarantee the highest performances in terms of convergence time.

FIG. 12,13, Extension of Existing Control Plane Protocols

As part of some embodiments, the OSPF is extended in a similar way as done for Optical Network control plane (e.g., ASON/WSON). In case of ASON the OSPF has been extended into the G.OSPF-TE (Generalized OSPF with Traffic Engineering extensions) in order to collect/disseminate technology specific information such as wavelength continuity, physical impairments and so forth.

In this example OSPF is extended via the definition of a TE Link LSA (Link State Advertisement) capable of carrying also synchronization information. In particular, for the synchronization applications discussed here, the G.OSPF-TE is adapted to distribute the synchronization network topology information. Note that no signalling protocol extension is required as the information distributed via the extended OSPF is sufficient for the nodes to properly set up the synchronization paths.

Each TE Link in the network is described by the OSPF with a TE Link LSA (as specified in RFC 3630—Traffic Engineering (TE) Extensions to OSPF Version 2) containing a Link TLV (Type Length Value). A TE Link LSA comprises a certain number of sub-objects called sub-TLVs. Each of these sub-objects describes some of the characteristics of the TE Link.

Each TE Link contains one or more Link Components (LC) representing a physical connection between two adjacent nodes. The first parameter associated with a LC is a local identifier that can univocally identify it: the Link Component ID. Other parameters are technology specific and, in this specific context, are related to synchronization.

FIG. 12 provides an example of a sync-specification Sub-TLV which comprises two Link Components and the synchronization parameters associated to them. As shown by (*) in the top row, this value of 1 assumes that this is the only sync extension. In the second row, the indication (**) next to the Sub-Sub-Type value is to note that others can be added for other synchronization methods (e.g., packet-based, SDH, etc), and the parameters set will change accordingly.

An additional set of synchronization parameters (e.g., clock quality and state) is associated to the node. These parameters can be disseminated via a specific sub-TLV in the TE Link LSA as shown in the example of FIG. 13.

FIG. 13 shows an example of synchronization specific sub-TLV (node case) in which Again in the first row, the indication (*) is there to note the assumption that this is the only sync extension. In the second row, the indication () is there to note the assumption that this is the only node type. Alternatively other Sub-Sub-Types (with increasing id, i.e., 3, 4, etc.) can be added for other node types, and the parameters set will change accordingly. In the fourth row, the indication (*) is to note that this node function can correspond to the content of the eighth column of FIG. 4, E.g., Network PRC, G.8263 TC, etc.

The second parameter, in the sixth row is supervision status in this example, which corresponds to the content of the seventh column of FIG. 4. Hence it can be seen how this can be used to exchange information between nodes to fill in the table of FIG. 4, which can then be used as a basis for various trail comparison algorithms, to select a best synchronisation trail for each node, and thus configure the synchronization network.

In addition to OSPF, other existing or new protocols could be considered as long as they provide additional functionalities. For example, the LMP (Link Management Protocol), which runs between a pair of nodes and is aimed at TE Links management, could be used to enhance the synchronization solution.

Other Features

The new protocol adapted to convey the new transmission characteristics can be arranged to coexist with existing synchronization mechanisms. Where any conflict arises, there may be a need to have nodes ignore some parts, such as the "SSM" protocol, which might need to be ignored in order to avoid possible misalignments.

For the case of the physical layer based synchronization networks (e.g. SyncE, SDH), all the protocol packets described above travel a single IP hop. That means that all network elements that participate into the synchronization network (or that terminate it) have to be properly addressed (the protocol shall operate on link basis). In other words the packets shall not be carried transparently over network elements that are part of the synchronization network.

Other variations and embodiments can be envisaged within the claims.

The invention claimed is:

1. A method of configuring a node of a synchronization network, the method comprising the steps of:
   a) for a plurality of nodes, determining information about synchronization sources of a plurality of synchronization trails for passing synchronization information from the synchronization source to the node to provide a synchronization reference, a part of at least one of the trails for at least one node of the plurality of nodes using asynchronous based communication to pass the synchronization information, and, a part of at least one of the trails for at least one node of the plurality of nodes using synchronous based communication to pass the synchronization information;
   b) determining synchronization transmission characteristics of the part which uses the asynchronous based communication, wherein the synchronization transmission characteristics indicate a measure of transmission quality; and
   c) for the plurality of nodes, comparing the trails leading to the node by using the determined synchronization transmission characteristics, and selecting which of these trails to use for providing the synchronization reference for the node;
   wherein the synchronization reference provides for at least one of frequency synchronization and time synchronization.

2. The method of claim 1, the step of determining synchronization transmission characteristics comprising determining information about the plurality of nodes using asynchronous based communication to pass the synchronization information.

3. The method of claim 2, the step of determining information about the plurality of nodes comprises determining information relating to enhancement by any node of the synchronization information.

4. The method of claim 3, the step of determining information relating to enhancement comprising determining information relating to regeneration of the synchronization information at another node along the trail.

5. The method of claim 3, the enhancement comprising information about delays to the asynchronous based communication carrying the synchronization information, the delays being determined by another node along the trail.

6. The method of claim 5, the information about delays comprising any one or more of: delays internal to a node within the plurality of nodes, delays between nodes within the plurality of nodes, and amounts of delay variation.

7. The method of claim 1, having the step of determining information about synchronous parts of any trails leading to the at least one node and using this information in making the comparison.

8. The method of claim 1, the step of determining the synchronization transmission characteristics being carried out by the at least one node, and the at least one node having a record of the synchronization trails to itself and to other nodes within the plurality of nodes.

9. The method of claim 1, having the steps of receiving at the at least one node an update of the synchronization transmission characteristics from a neighbouring node, reassessing the selection based on the updated synchronization transmission characteristics, selecting a new one of the synchronization trails for passing the synchronization information for use as the synchronization reference, and sending out updates to neighbouring nodes to indicate the updated synchronization transmission characteristics and the new trail selection.

10. A node for a synchronization network, the node comprising:
   a memory; and
   one or more processors coupled to the memory, the one or more processors operable to:
      for a plurality of nodes, determine information about sources of a plurality of synchronization trails which lead to the node, for passing synchronization information from the synchronization sources to the node, to provide a synchronization reference, a part of at least one of the trails for at least one node of the plurality of nodes using asynchronous based communication to pass the synchronization information, and, a part of at least one of the trails for at least one node of the plurality of nodes using synchronous based communication to pass the synchronization information;

determine synchronization transmission characteristics of the part which uses the asynchronous based communication, wherein the synchronization transmission characteristics indicate a measure of transmission quality; and for the plurality of nodes, compare the trails leading to the node by using the determined synchronization transmission characteristics, and selecting which of these trails to use for providing the synchronization reference for the node;

wherein the synchronization reference provides for at least one of frequency synchronization and time synchronization.

11. The node of claim 10, further comprising a portion of a control plane for controlling a communication network synchronized by the synchronization network, the one or more processors being implemented by the portion of the control plane.

12. The node of claim 10, wherein when determining synchronization transmission characteristics the one or more processors are operable to determine information about the plurality of nodes using asynchronous based communication to pass the synchronization information.

13. The node of claim 12, wherein when determining information about the plurality of nodes the one or more processors are operable to determine information relating to enhancement by any node of the synchronization information.

14. The node of claim 13, wherein when determining information relating to enhancement the one or more processors are operable to determine information relating to regeneration of the synchronization information at another node along the trail.

15. The node of claim 13, wherein the enhancement comprises information about delays to the asynchronous based communication carrying the synchronization information, the delays being determined by another node along the trail.

16. The node of claim 15, the information about delays comprising any one or more of: delays internal to a node within the plurality of nodes, delays between nodes within the plurality of nodes, and amounts of delay variation.

17. The node of claim 12, wherein the one or more processors are operable to determine information about synchronous parts of any trails leading to the at least one node and using this information in making the comparison.

18. The node of claim 12, wherein the one or more processors are operable to maintain a record of the synchronization trails to itself and to other nodes within the plurality of nodes.

19. The node of claim 12, wherein the one or more processors are operable to receive an update of the synchronization transmission characteristics from a neighboring node, reassess the selection based on the updated synchronization transmission characteristics, select a new one of the synchronization trails for passing the synchronization information for use as the synchronization reference, and send out updates to neighboring nodes to indicate the updated synchronization transmission characteristics and the new trail selection.

20. A non-transitory computer-readable storage medium storing instructions executable by a processor to cause the processor to:

for a plurality of nodes, determine information about synchronization sources of a plurality of synchronization trails for passing synchronization information from the synchronization source to the node to provide a synchronization reference, a part of at least one of the trails for at least one node of the plurality of nodes using asynchronous based communication to pass the synchronization information, and, a part of at least one of the trails for at least one node of the plurality of nodes using synchronous based communication to pass the synchronization information;

determine synchronization transmission characteristics of the part which uses the asynchronous based communication, wherein the synchronization transmission characteristics indicate a measure of transmission quality; and for the plurality of nodes, comparing the trails leading to the node by using the determined synchronization transmission characteristics, and selecting which of these trails to use for providing the synchronization reference for the node;

wherein the synchronization reference provides for at least one of frequency synchronization and time synchronization.

* * * * *